(12) United States Patent
King (10) Patent No.: US 8,116,621 B2
(45) Date of Patent: Feb. 14, 2012

(54) SYSTEM AND METHOD OF WIRELESS POWER LEVEL CONTROL OF TTL CAMERA FLASH BY RADIO

(76) Inventor: Kevin James King, Vancouver, WA (US)

( * ) Notice: Subject to any disclaimer, the term of this patent is extended or adjusted under 35 U.S.C. 154(b) by 0 days.

(21) Appl. No.: 12/614,443

(22) Filed: Nov. 8, 2009

(65) Prior Publication Data

US 2010/0124412 A1      May 20, 2010

Related U.S. Application Data

(60) Provisional application No. 61/112,731, filed on Nov. 8, 2008.

(51) Int. Cl.
*G03B 17/00* (2006.01)
(52) U.S. Cl. ........................................................ 396/56
(58) Field of Classification Search ...................... 396/56
See application file for complete search history.

(56) References Cited

U.S. PATENT DOCUMENTS

| | | | | | |
|---|---|---|---|---|---|
| 4,884,094 | A | * | 11/1989 | Kitaura et al. | 396/57 |
| 5,359,375 | A | * | 10/1994 | Clark | 396/56 |
| 7,362,965 | B2 | * | 4/2008 | Clark | 396/56 |
| 7,783,188 | B2 | * | 8/2010 | Clark | 396/198 |
| 2002/0009296 | A1 | * | 1/2002 | Shaper et al. | 396/56 |
| 2008/0298792 | A1 | * | 12/2008 | Clark | 396/56 |

* cited by examiner

*Primary Examiner* — Rodney Fuller (57) ABSTRACT

Methods and systems to set an amount of light to be emitted by a remote flash device may comprise: a first radio communication device coupled to a camera, a means for a user to set a desired light emission intensity or power emission level which may be perceptible to a first radio communication device, and at least a second radio communication device coupled to a remote flash device. The first radio communication device may transmit at least one radio signal to the second radio communication device which may comprise a power emission level. The at least second radio communication device may send any sequence of data or control signals to a remote flash device which may be representative of the desired light emission intensity or power emission level. The at least second radio communication device may send activation signals to the coupled flash device, followed by allowing a delay interval to elapse, followed by sending quench signals to the coupled flash device.

24 Claims, 10 Drawing Sheets

SYSTEM AND METHOD OF WIRELESS POWER LEVEL CONTROL OF TTL CAMERA FLASH BY RADIO

CROSS REFERENCES TO RELATED APPLICATIONS

This application claims the benefit of U.S. Provisional Patent Application No. 61/112,731 filed Nov. 8, 2008, and incorporates the disclosure of that application by reference.

SUMMARY OF THE INVENTION

In various representative aspects, the present invention includes a radio transmitter coupled to a camera and a radio receiver coupled to a flash device, which may be remote. In accordance with an exemplary embodiment, a system to wirelessly actuate a flash device may comprise: a first radio communication device coupled to a camera and at least a second radio communication device coupled to the remote flash device. Among exemplary embodiments, the first radio communication device may transmit at least one radio signal to the second radio communication device in response to receiving camera communications sent from the camera, a user input, or any combination there of. The second radio communication device may set a delay interval, may send activation signals to the flash device, may send quench signals to the flash device, or any combination there of in response to receiving the at least one radio signal from the first radio communication device.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures may be illustrated for simplicity and clarity and have not necessarily been rendered according to any particular sequence. For example, steps that may be performed concurrently or in different order may be illustrated in the figures to help improve understanding of embodiments of the present invention.

DETAILED DESCRIPTION OF EXEMPLARY EMBODIMENTS

Intro

The present invention may be described herein in terms of functional block components and various processing steps. Such functional blocks may be realized by any number of hardware or software components configured to perform the specific functions and achieve the various results. For example, the present invention may employ various cameras, flash devices, radio transmitters, radio receivers, as well as any software to provide functionality and interconnectivity between such cameras, flash devices, radio transmitters, and radio receivers.

In accordance with various exemplary embodiments, cameras for example, may comprise any of still and/or video graphic devices that may capture images in any manner, for example digitally, by film, or any other manner now known or developed in the future that may benefit from the present invention. The present invention may further employ various flash devices, for example, wireless flash devices, strobe light devices, synchronous flash devices, hardwired flash devices, etc. Exemplary flash devices may comprise a single flash device, a plurality of flash devices, coordinated flash devices, various light frequency flash devices, integral flash devices, and the like. Exemplary flash devices may provide flashes comprising various intensity, duration, timing, color, etc. With respect to radio transmitter and radio receivers, the present invention may employ any now known or future developed transmitter/receiver components, and the radio transmitters and receivers may be configured to operate over a single radio frequency, multiple radio frequencies, as well as any other electromagnetic frequency outside of the typical "radio" band. The transmitter/receiver components may function on any one or combination of wavelength, wave type (square wave, s-wave, etc.), amplitude, modulation, frequency deviation, frequency bandwidth, period, power, range, and any other like electromagnetic wave characteristics. Moreover, the radio transmitter may also comprise radio receiving capabilities and may be termed "radio transceiver" capable of both sending and receiving radio signals, and similarly the radio receiver may also comprise radio transmission capabilities and may be termed "radio transceiver" capable of both receiving and sending radio signals.

Thus, the various components may carry out a variety of functions, and in addition, the present invention may be practiced among any number of general environments, for example, still photography, video graphy, high speed photography, portrait imaging, landscape imaging, etc. The system described may be merely one exemplary application for the invention, and the present invention may employ any number of conventional techniques for coordinating a remote flash device and a camera.

Figure 1:
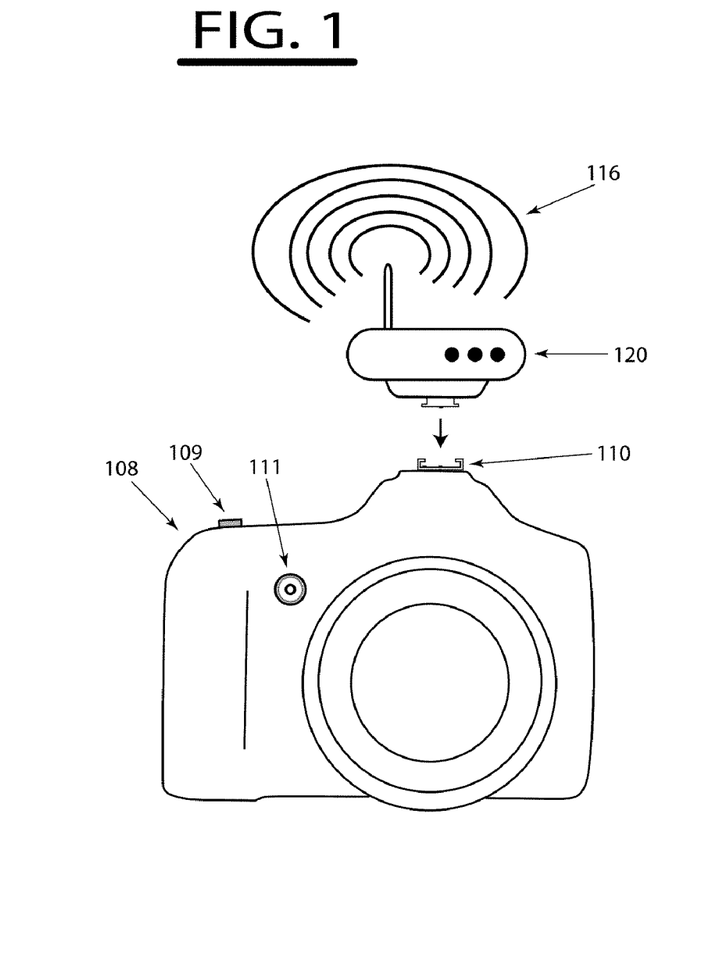
FIG. 1 representatively illustrates a front view of a camera coupled to an exemplary first radio communication device.

Various representative implementations of the present invention may be applied to any system for a camera to communicate with a remote flash device. Turning now to FIG.

1, in accordance with an exemplary embodiment, the present invention may comprise a first radio communication device 120 ("transmitter unit") which may be coupled to a camera 108. The transmitter unit 120 may be coupled to a camera 108 by electrically connecting to a hot shoe connector 110 of the camera 108. The transmitter may alternately or additionally be coupled to a camera 108 by electrically connecting to a synchronization connector 111 or port, or data terminal, or any other portion, connector, surface, circuit, or component of a camera either externally or internally to the camera which may provide indication of the operation of a camera, the settings of a camera, user interaction with a camera, the depression of a camera shutter release button 109, or the action of actuating a camera shutter, activating an image acquisition operation of a digital sensor of a camera, or any process, signal, data, data stream, or indication which may characteristically precede an operation or activation of a camera.

A transmitter unit may broadcast radio signals 116 along typical "radio" band frequencies to communicate with an at least second radio communication device 250 in response to an activation or process of a camera or in response to an input or user's interaction with the camera 108 or the transmitter unit 120. The radio signals 116 may effectuate the communication between the camera 108 and the remote flash device 212 via the at least second radio communication device 250.

Figure 2:
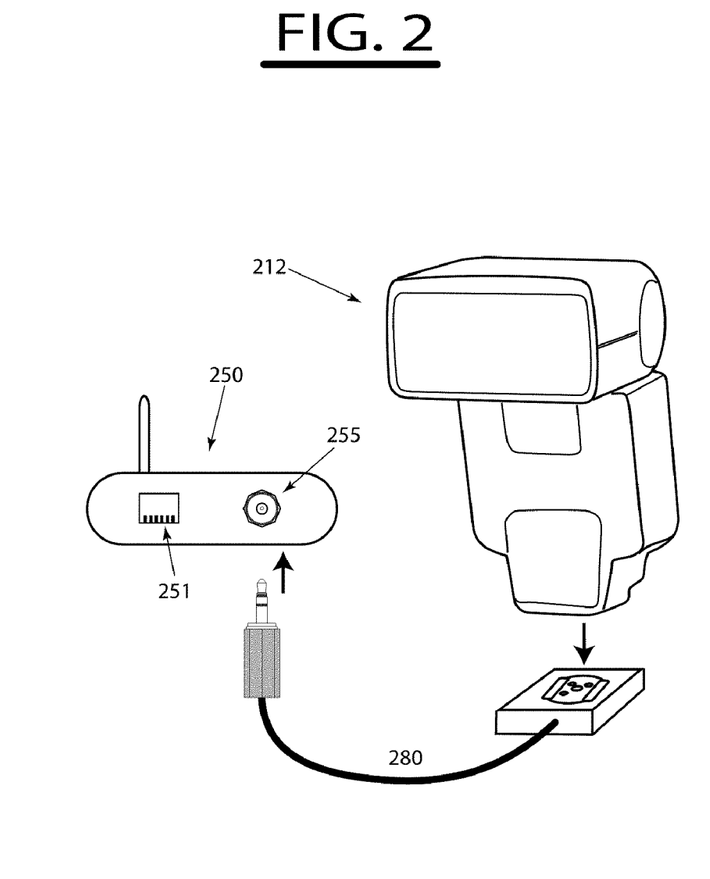
FIG. 2 representatively illustrates a perspective view of a flash device coupled to an exemplary at least second radio communication device.

Turning now to FIG. 2, in accordance with an exemplary embodiment, an at least second radio communication device 250 ("receiver unit") may be coupled with a flash device 212. The receiver unit 250 may be coupled with a flash device using an adaptor cable assembly 280 which may form an electrical connection between a jack, terminal, port, or connector 255 of a receiver unit 250 and the hot shoe connector contacts of a flash device 212. A receiver unit 250 may also comprise a hot shoe connector directly on the exterior of the receiver unit 250 which may be coupled directly to a flash device 212 without the need of an adaptor cable assembly 280.

Figure 3:
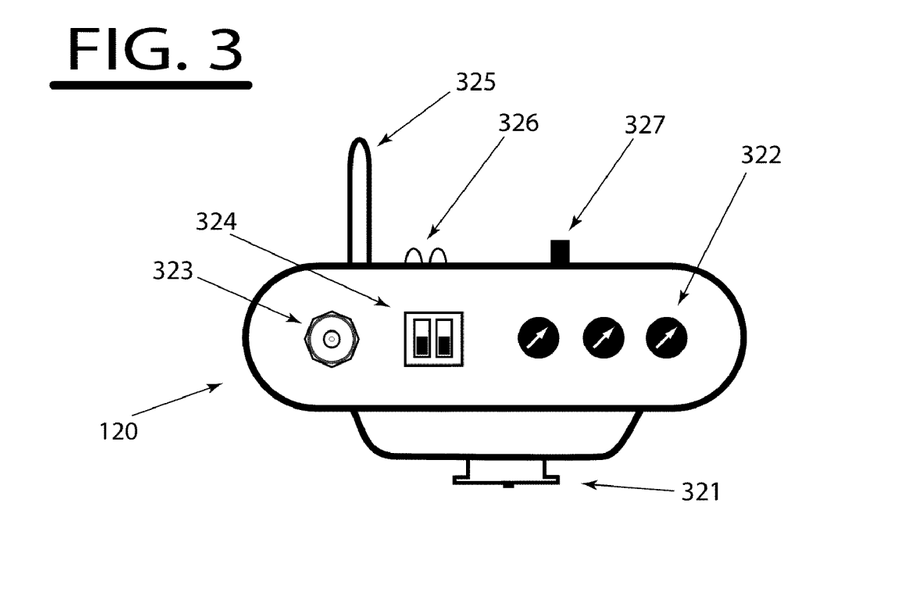
FIG. 3 representatively illustrates a front view of an exemplary first radio communication device.

Turning now to FIG. 3, in accordance with an exemplary embodiment, a transmitter unit 120 may comprise externally or internally accessible components such as but not limited to a hot shoe connector 321 having one or more electrical contacts which may correspond to one or more electrical contacts of a hot shoe connector 110 of a camera 108. The hot shoe connector 321 may provide also a ground contact used to connect the common electrical ground of a circuit of the transmitter unit 120 to the common electrical ground of a circuit of a camera 108. A synchronization port or connector 323 may provide similar functional electrical connection between a circuit of a transmitter unit 120 and a synchronization port 111 or other port or data connector of a camera 108 which may provide a signal or signals useful to a transmitter unit 120. An antenna 325 which may extend externally to, internally to, or comprised within the housing of a transmitter unit 120 may be provided for radiating radio signals into free space. A user feedback indicator 326 which may comprise one or more indicator lights, alpha and/or numeric display, or a graphical display such as a video display or touch screen type display may be provided to convey status or other useful indications of a transmitter unit 120 to a user. A user input means 327 which may comprise one or more buttons, switches, dials, or selectors, which may be analog or digital, as well as may comprise a touch sensitive surface, capacitive sensing surface, or a touch sensitive surface used with a touch sensitive graphical display may be provided which may provide input for powering a transmitter unit 120 on and off, setting various operating conditions, causing a test activation to occur or performing any other function which may be useful to a user. A selector switch or switches 324 may be provided which may allow a user to set a radio frequency or transmitting channel or channels which may be used by a transmitter unit 120. The function of selector switches 324 may be combined with or used in place of another user input means 327 or vise versa.

One or more means may be provided externally to or internally to a transmitter unit 120 which may be used by a user to indicate a power emission level to a circuitry of a transmitter 120. A power emission level may be an indication as to the amount of light a flash device should emit when triggered (also defined in this discussion and in the claims as "light emission intensity"), the power emission level or light emission intensity may be a measure of the amount of light produced by a flash device and thus the amount of light contributed to a subject or scene being photographed upon an activation event or activation sequence of a flash device. Such a means of setting a power emission level may be embodied using one or more potentiometers or dials 322, or may be embodied by including an additional functionality of a user input means 327 or selector switches 324.

Figure 4:
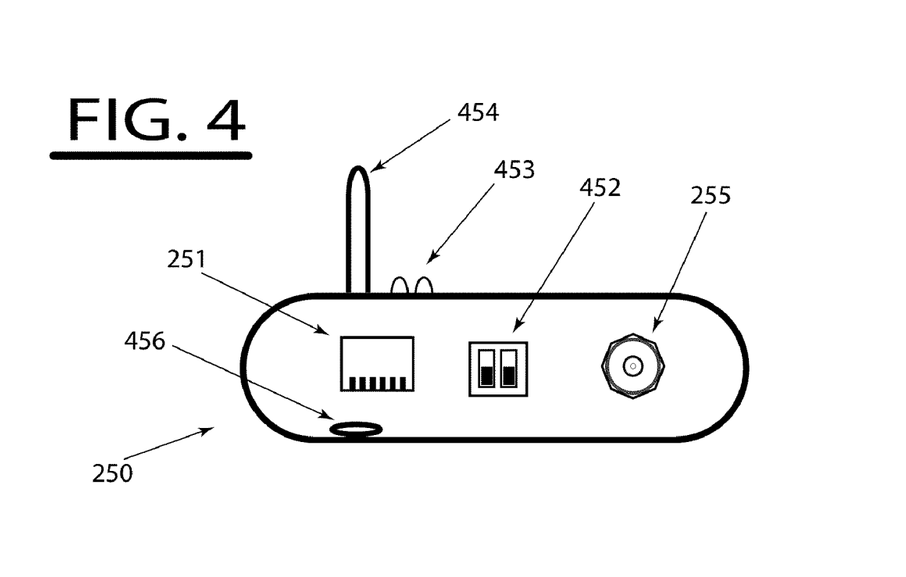
FIG. 4 representatively illustrates a front view of an exemplary at least second radio communication device.

Turning now to FIG. 4, in accordance with an exemplary embodiment, a receiver unit 250 may comprise externally or internally accessible components such as but not limited to a connector or port 255 which may be used to electrically connect a circuitry of a receiver unit to the electrical contacts of a flash device 212 either directly or via an adaptor cable assembly 280. The connector or port 255 may comprise an electrical contact which may be used to send activation signals to a flash device 212, may comprise an electrical contact which may be used to send quench signals to a flash device 212, and may comprise an electrical contact which may be used to connect a common ground of a circuit of a receiver unit 250 to the common ground of a circuit of a flash device 212. An antenna 454 which may extend externally to, internally to, or comprised within the housing of a receiver unit 250 may be provided for receiving radio signals from free space. A user feedback indicator 453 which may comprise one or more indicator lights, alpha and/or numeric display, or a graphical display such as a video display or touch screen type display may be provided to convey status or other useful indications of a receiver unit 250 to a user. A user input means 452 which may comprise one or more buttons, switches, dials, or selectors, which may be analog or digital, as well as may comprise a touch sensitive surface, capacitive sensing surface, or a touch sensitive surface used with a touch sensitive graphical display may be provided which may provide input for powering a receiver unit 250 on and off, setting various operating conditions, causing a test activation to occur or performing any other function which may be useful to a user. A user input means 452 may also allow a user to set a radio frequency or receiving channel or channels which may be used by a receiver unit 250.

A receiver unit 250 may also provide in accordance with an exemplary embodiment a data port, hot shoe connector, or other electrical contacts 251 which may be used to communicate various settings, parameters, operating modes, activation signals, quench signals, or other useful information to a flash device 212. An opening or window 456 may be provided on the exterior of a receiver unit 250 which may allow a light signal 878 to be transmitted from a receiver unit 250 to a flash device 212, or a flash device 814.

Figure 5:
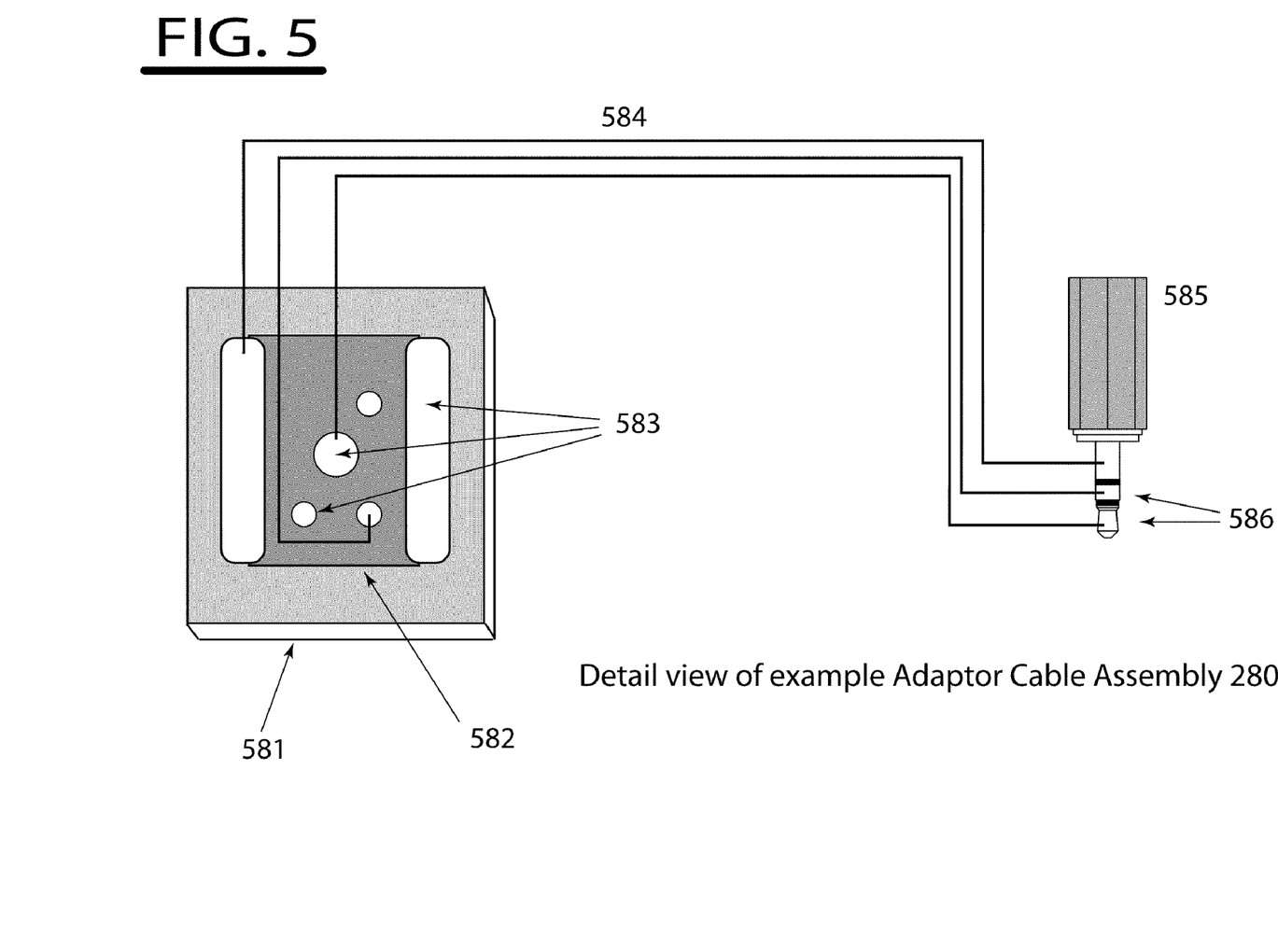
FIG. 5 representatively illustrates a schematic view of an exemplary adaptor cable assembly which may couple an at least second radio communication device to a flash device.

Turning now to FIG. 5, in accordance with an exemplary embodiment, an adaptor cable assembly 280 may comprise a jack or plug 585 which may be a ⅛" stereo phonographic connector which is electrically connected via wires or conductors 584 or a cord comprising wires or conductors to a connecting apparatus 581 which may house a connector 582 which may provide access to electrical contacts 583 which may be arranged substantially similar to a hot shoe connector 110 which may be present on a camera 108. The electrical contacts 583 may correspond to the activation signal contact of a flash device 212, the quench signal contact of a flash device 212, and the ground contact of a flash device 212.

Operation

A flash device 212 may have the ability to be activated at a certain point in time in response to receiving an activation signal on an activation contact of the flash device. An activation contact may be present on the hot shoe connector of a flash device. An activation signal may be indicated to a flash device by pulling a voltage present on an activation contact of a flash device to a lower voltage, the lower voltage may be at or substantially near ground voltage potential (pulling a "high" voltage to a "low" voltage), this an "activation signal" or "activation signals". Upon receiving an activation signal, a flash device 212 may cause a xenon tube, light emitting diode, filament lamp, or other means of producing human visible or human invisible illuminating light ("xenon tube") to begin emitting illuminating light. A flash device 212 may also have the ability to be quenched at a certain point in time in response to receiving a quench signal on a quench contact of the flash device. A quench contact may be present on the hot shoe connector of a flash device. A quench signal may be indicated to a flash device by pulling a voltage present on a quench contact of a flash device to a lower voltage, the lower voltage may be at or substantially near ground voltage potential (pulling a "high" voltage to a "low" voltage), this a "quench signal" or "quench signals". Upon receiving a quench signal, a flash device 212 may cause a xenon tube to stop emitting illuminating light.

Thus, the interval of time which may pass between an activation signal and a quench signal may be substantially representative of the interval of time during which a xenon tube is producing light and moreover, the interval of time during which a xenon tube is producing light may be substantially representative of the total amount of illuminating light emitted by the xenon tube during the interval. Thus, the interval of time which may pass between an activation signal and a quench signal may be substantially representative of the total amount of illuminating light which may be emitted by a xenon tube of a flash device 212.

In accordance with an exemplary embodiment of the present invention, a circuitry of a receiver unit 250 may be able to cause an activation signal from a receiver unit 250 which may be perceptible to a flash device 212; followed by a substantially specific interval of time; followed by a quench signal from a receiver unit 250 which may be perceptible to a flash device 212; the substantially specific interval of time hereafter a "delay interval".

In accordance with an exemplary embodiment of the present invention, a user may input a level or setting to a user interface 327, selector switch 324, or dials 322, of a transmitter unit 120 which may be representative of a desired amount of light to be emitted from a xenon tube of a flash device 212 when activating the flash device in synchronization with the acquisition of an image or images of a camera 108; the desired amount of light to be emitted hereafter a "power emission level". A user may alternately or additionally input a desired power emission level of a flash device directly to the controls available directly on a camera 108 if the camera 108 is able to make the desired power emission level perceptible to a transmitter unit 120 through any means which may include an electrical signal, electrical signals, or data communication which may be provided between a camera 108 and a transmitter unit 120 via electrical contacts of a hot shoe connector 110 and a hot shoe connector 321. It is considered that any means of user input or control which may be perceptible to a transmitter unit 120 may be used to communicate a desired power emission level between a user and a transmitter unit 120.

A transmitter unit 120 may communicate radio signals 116 which may include a data or indication of a desired power emission level (hereafter "transmitted emission level"). The data comprised within a transmitted emission level may be any value which may indicate or otherwise be representative of a power emission level, including but not limited to a result of an analog to digital conversion, a value of a data memory which may subsequently be referenced to an interval of time, or may be an explicit exact number of microseconds, milliseconds, or other value explicitly indicating a period of time, or the like. A transmitted emission level or a power emission level may be received by a receiver unit 250. In accordance with an exemplary embodiment, a receiver unit 250 may be able to reference a transmitted emission level to a corresponding delay interval. A delay interval may range from a few microseconds to several milliseconds. It is considered that a delay interval may be shorter, or a delay interval may be longer, depending on the application, environment of use, and characteristics of a particular flash device 212 being used.

In accordance with an exemplary embodiment, a user may set a power emission level on a transmitter unit 120. A user may then activate a shutter of a camera 108, the activation may have been caused by a user by the depression of a shutter release button 109 of a camera 108. A camera 108 may then provide an activation signal via a hot shoe connector 110 or a synchronization connector 111 which is perceptible to a transmitter unit 120. A transmitter unit 120 may then read a set power emission level from a dial or may reference a power emission level from a data memory of a transmitter unit 120. A transmitter unit 120 may then transmit a radio signal or radio signals 116 to which a receiver unit 250 may be responsive. The transmitted radio signals 116 may indicate a command to cause a receiver unit to begin sending activation signals to a flash device 212, and the radio signals may also comprise a transmitted emission level which may correspond to a power emission level which may have been previously set on a transmitter unit 120. Upon reception of the radio signals 116, a receiver unit 250 may send activation signals to a coupled flash device 212. The receiver unit may reference the received transmitted emission level to a delay interval. The receiver unit may allow the time duration represented by the delay interval to elapse, and may then send quench signals to a coupled flash device 212.

In accordance with an exemplary embodiment, a similar sequence may occur in which a delay interval is transmitted prior to a signal or command to send activation signals to a flash device as follows. A user may set a power emission level on a transmitter unit 120. The transmitter unit 120 may then automatically or in response to an input from a user transmit radio signals 116 to which a receiver unit 250 may be responsive. The transmitted radio signals 116 may comprise a command or data which may indicate a power emission level wherein the transmitted radio signals 116 do not comprise a command or data that would cause a receiver unit 250 to send activation signals or quench signals to a coupled flash device 212, these radio signals which may comprise a command or data representative of a power emission level which do not comprise a command or data that would cause a receiver unit 250 to send activation signals or quench signals hereafter "level only signals". A receiver unit 250 upon receiving level only signals may store a power emission level comprised within the level only signals to an internal data memory of the receiver unit 250. The receiver unit may subsequently reference the stored power emission level to a corresponding delay interval, the corresponding delay interval may be stored to a data memory of a receiver unit, the corresponding delay interval which may be stored to a data memory of a receiver unit hereafter a "stored delay interval". Some period of time following the transmission and reception of the level only signals, a user may activate a shutter of a camera 108, the activation may have been caused by a user by the depression of a shutter release button 109 of a camera 108. A camera 108 may then provide an activation signal via a hot shoe connector 110 or a synchronization connector 111 which is perceptible to a transmitter unit 120. A transmitter unit 120 may then transmit radio signals 116, or a second radio signal, to which a receiver unit 250 may be responsive. The transmitted radio signals 116, or a second radio signal, may comprise a command or data that would cause a receiver unit 250 to send activation signals to a coupled flash device 212, followed by allowing a stored delay interval to elapse, followed by the receiver unit 250 sending quench signals to a coupled flash device 212; the transmitted radio signals 116 which may comprise a command or data that would cause a receiver unit 250 to send activation signals, followed by allowing a stored interval to elapse, followed by the receiver unit 250 sending quench signals to a coupled flash 212 hereafter "activation only signals".

ADDITIONAL EXEMPLARY EMBODIMENTS

It is considered by the present invention that various improvements and alternate embodiments of the present invention may be useful as follows.

In yet another exemplary embodiment, a plurality of power emission levels may be set by a user to a transmitter unit 120 wherein the plurality of power emission levels may each correspond to a desired amount of light to be emitted by a plurality of flash devices 212. This may be useful in such an example wherein a user has multiple flash devices placed in various locations within an environment and wherein the user desires the individual multiple flash devices to emit different amounts of light for example having one flash device as a main light, another flash device as a fill light, and so on. A plurality of power emission levels may be set by a user by providing multiple dials 120 or other appropriate means of setting multiple individual power emission levels via a user interface such as a video, graphical, alpha and/or numeric display together with an appropriate input means. The plurality of power emission levels may be transmitted by a transmitter unit 120 via radio signals 116 individually, sequentially, or together in a single transmission or radio data packet. The plurality of power emission levels may be transmitted together with a signal or data which may cause a receiver unit to immediate begin sending activation signals to a coupled flash device 212, or the plurality of power emission levels may be transmitted as level only signals. In accordance with the stated embodiment, a receiver unit 250 may provide a means of allowing a user to select which of the plurality of power emission levels to which the individual receiver unit 250 should be responsive. This setting of the desired individual power emission level of the plurality of power emission levels may be made via selector switches 452 or other appropriate user interface of a receiver unit 250.

In yet another exemplary embodiment, a transmitter unit 120 may provide a "dead band" near the low set point of dials 322. When a user adjusts a power emission level below a given level, a transmitter unit 120 may communicate a value for a transmitted emission level which a receiver unit 250 may interpret as a zero level, or a level at which no activation signals and no quench signals will be sent to a coupled flash device 212. Thus when a user sets a power emission level below a given value, the setting has the effect of causing a flash device 212 to not emit any light when a camera is activated by a user. This may allow a user to individually disable a flash device which may used along with a plurality of other flash devices and thus the user has the ability to remotely enable or disable a certain flash device or flash devices. It is considered by the present invention that the stated dead band functionality additionally may be enabled or disabled by a user via any of the various user input controls discussed such that a user not desiring the functionality of being able to disable flash devices does not inadvertently disable flash devices when attempting to set flash devices to low power emission level settings.

Figure 8:
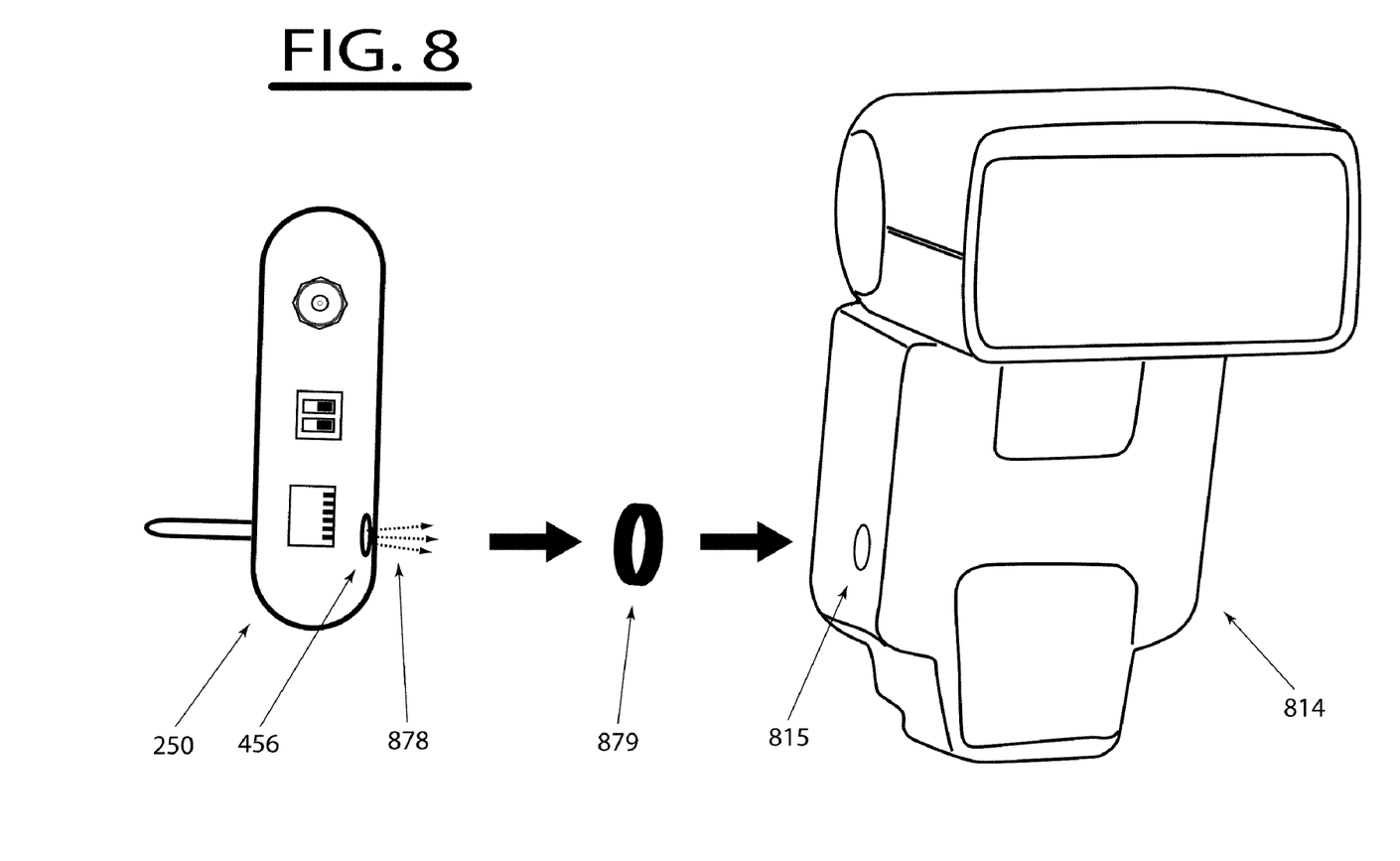
FIG. 8 representatively illustrates an alternate embodiment of an at least second radio communication device coupled to an alternate flash device.

In yet another exemplary embodiment, a receiver unit may instead of referencing a transmitted emission level or level only signals to a delay interval or a stored delay interval, may instead reference the transmitted emission level to a binary coded instruction which may be representative of an amount of illuminating light that should be produced by a flash device or may be representative of a command which may cause a flash device to carry out another useful function. The binary coded instruction may be communicated between a receiver unit 250 and a flash device 212 via various connectors or electrical contacts such as a data port 251 which may comprise a modular port such as a commercially available RJ-11 type port, a hot shoe connector present on a receiver unit which may provide electrical contacts corresponding to electrical contacts present on a flash device, or the like, a connector or jack 255, as well as via a light signal which may be pulsed or modulated so as to convey a binary pattern. As illustrated in FIG. 8, a sophisticated flash device 814 which may be similar to a flash device 212 may provide a light sensor 815 which may be responsive to binary coded pulses of light 878 which may be on a human visible or human invisible light spectrum. A material which blocks or attenuates light 879 may be placed around a light transmission window 456 of a receiver unit 250 and a light sensor window 815 of a sophisticated flash device 814 and may be placed between a receiver unit 250 and a sophisticated flash device 814, the material 879 may be useful in reducing the amount of light present in an environment from entering a light sensor window 815. Some sophisticated flash devices 814 may have the ability to activate a xenon tube only when light above a given intensity is sensed through a sensor window 815; in such case a delay interval may also correspond to a duration of time a constant light signal 878 or rapidly pulsed light signal is illuminated from a receiver unit in which case a sophisticated flash device 814 may cause the production of light from a xenon tube substantially near the start of the emission of a constant light signal 878 and may stop the production of light from a xenon tube substantially near the end of the emission of the constant light signal 878.

Mode of Manufacture—Transmitter

A discussion is provided detailing the best mode of manufacture in accordance with an exemplary embodiment of the present invention. It will be clear to one skilled in the art that any number of various substitutions and variations are possible in the actual construction of the present invention. The following discussion and illustrative schematics may not provide every individual component required for manufacture of the present invention. Any components which may have been omitted will be obvious as to requirement, arrangement, part selection, and use to one skilled in the art of electronic circuit design, analog and digital circuitry, printed circuit board design, microprocessors, and the use of various radio transmission and radio reception components and circuitry. Various components omitted from the provided discussion have been done so for simplicity and clarity and may include various resistors, capacitors, inductors, filters, regulators, isolators, and so on, among others.

Figure 6:
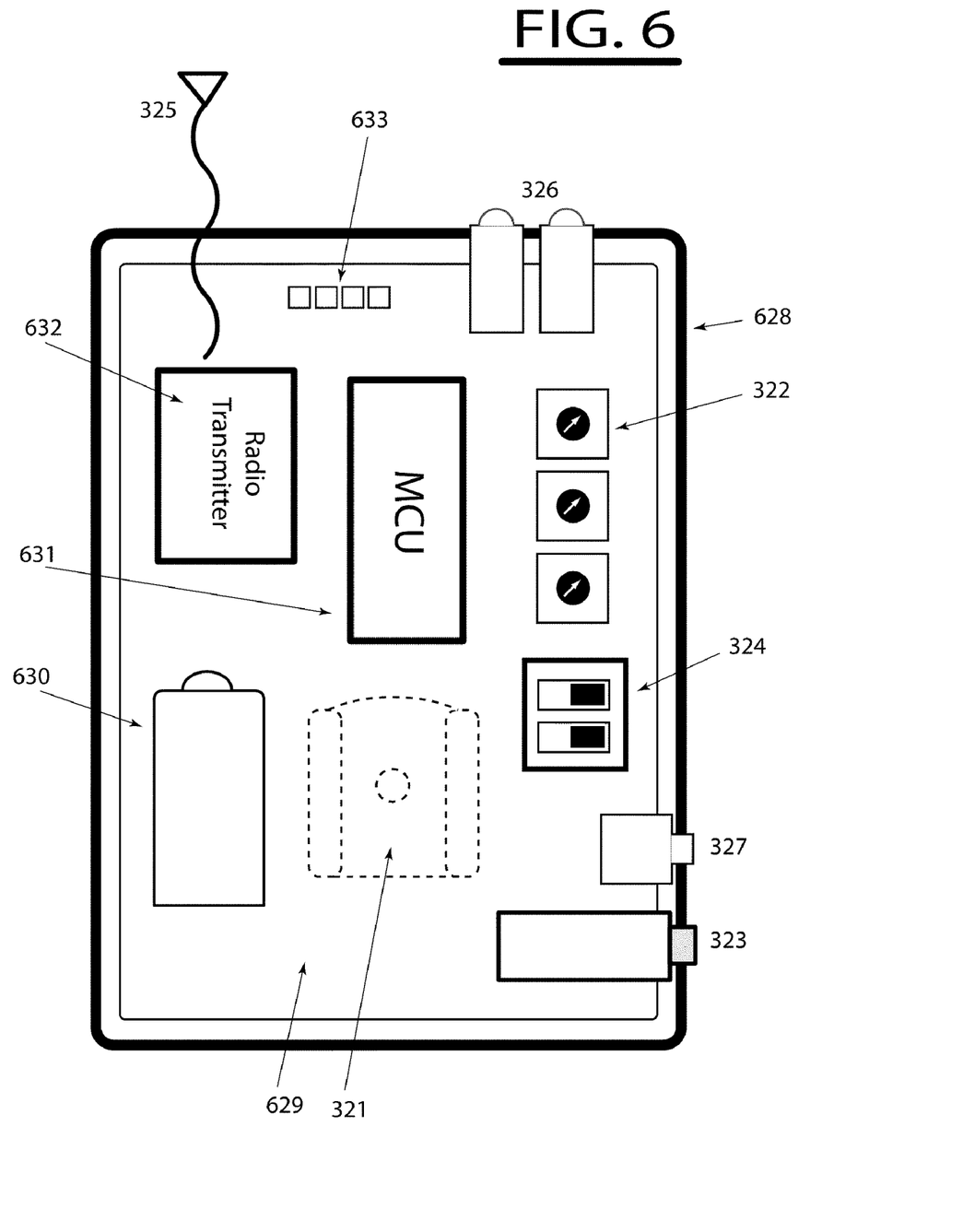
FIG. 6 representatively illustrates an internal layout of an exemplary first radio communication device.
Figure 7:
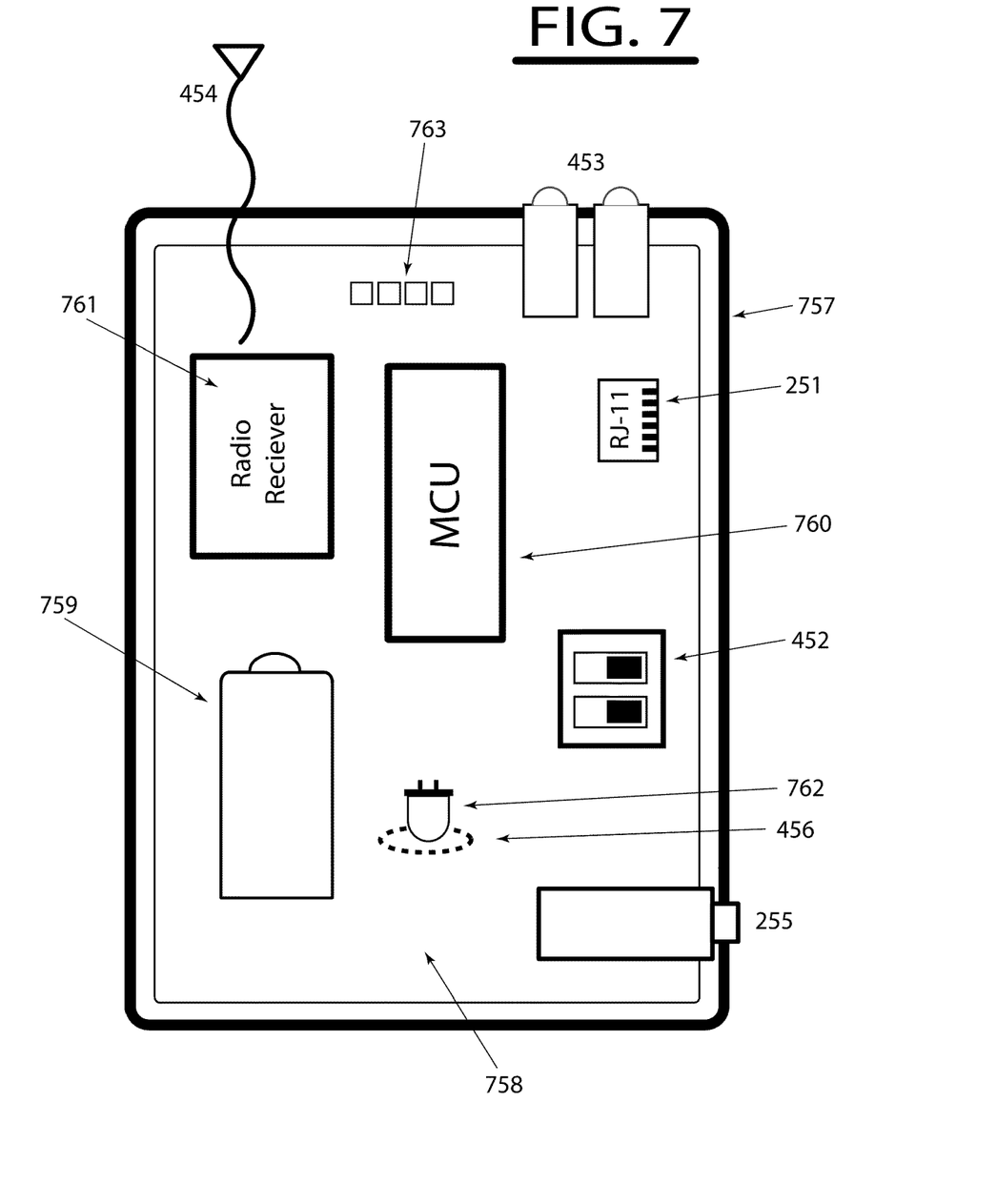
FIG. 7 representatively illustrates an internal layout of an exemplary at least second radio communication device.
Figure 9:
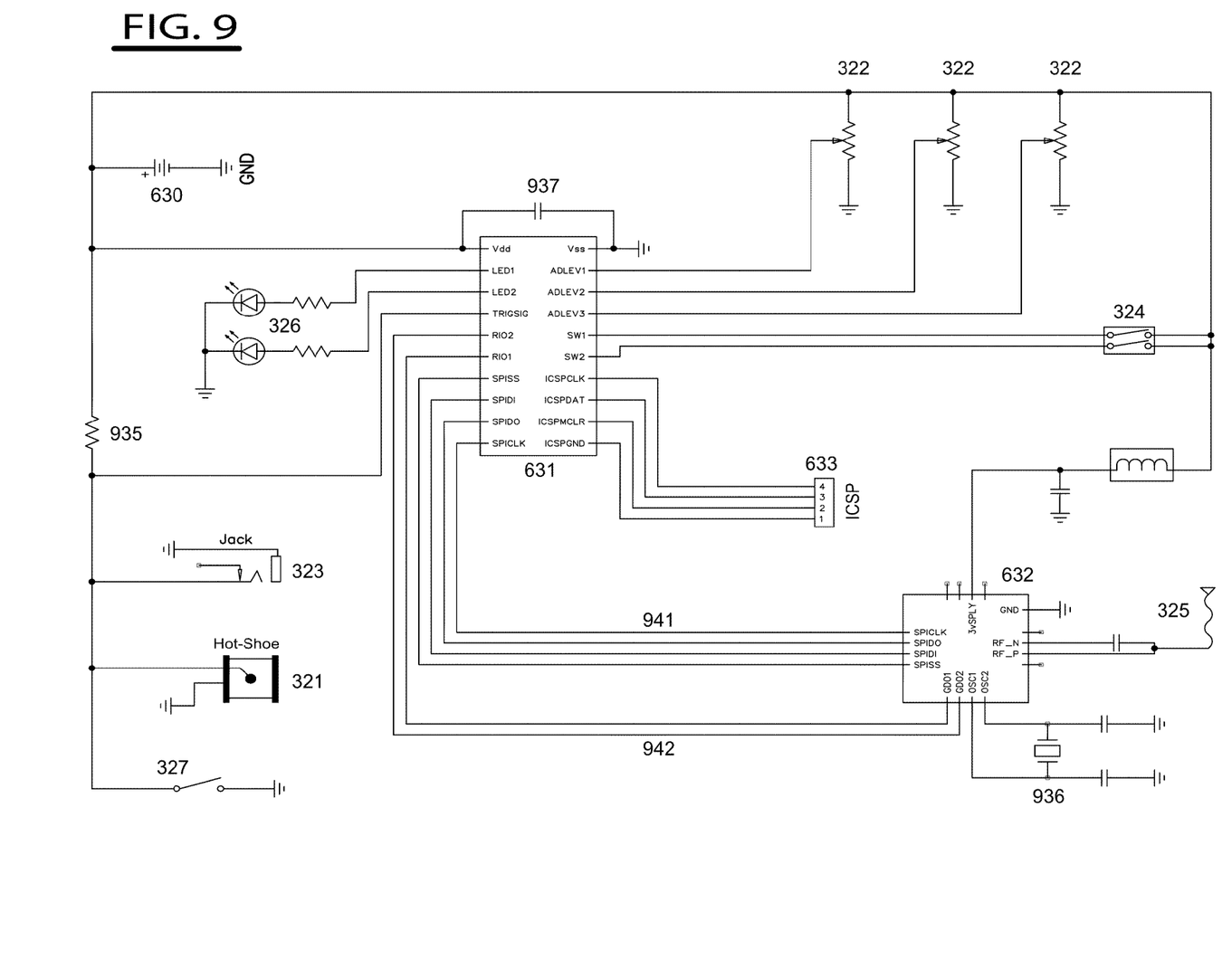
FIG. 9 representatively illustrates a simplified schematic view of an exemplary first radio communication device.
Figure 10:
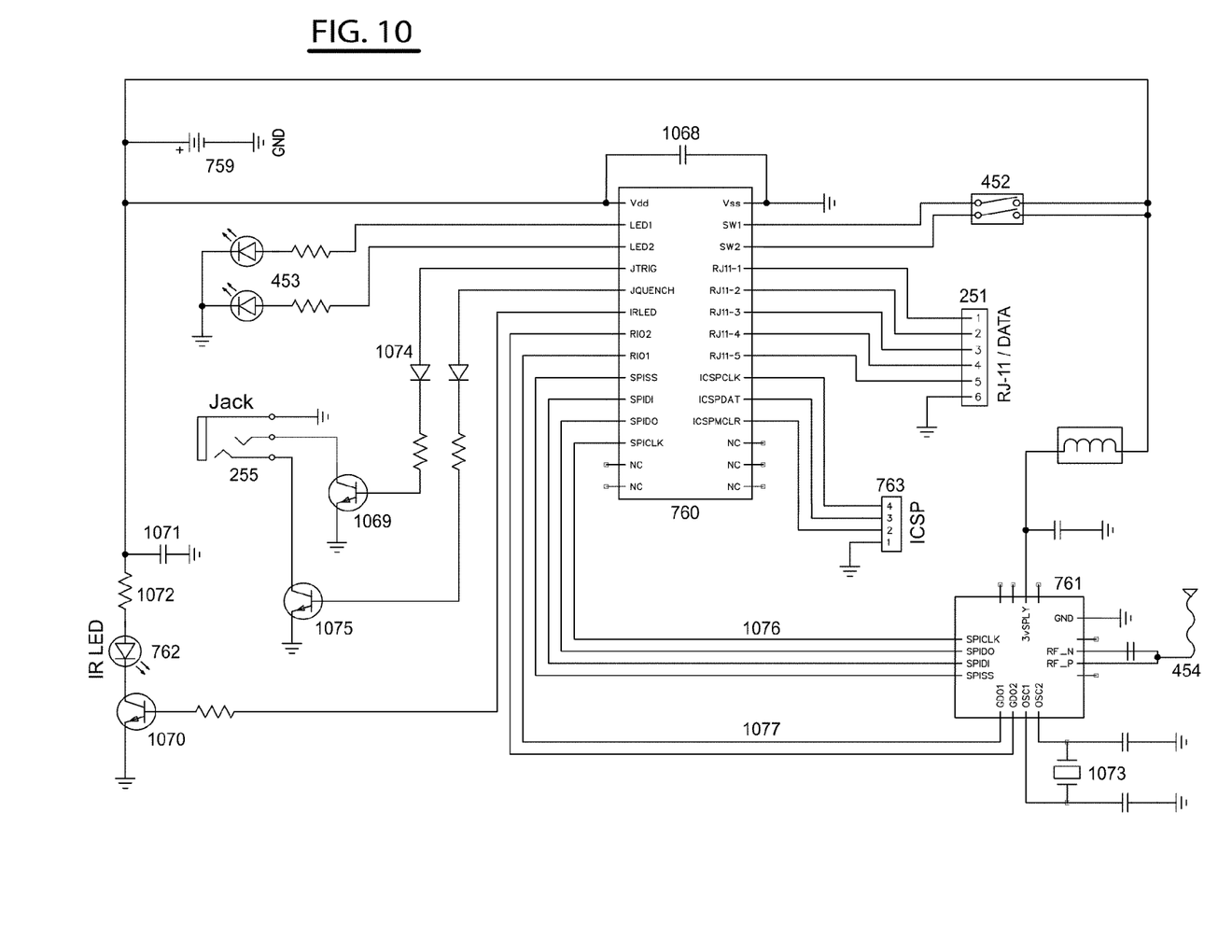
FIG. 10 representatively illustrates a simplified schematic view of an exemplary at least second radio communication device.
Figure 11:
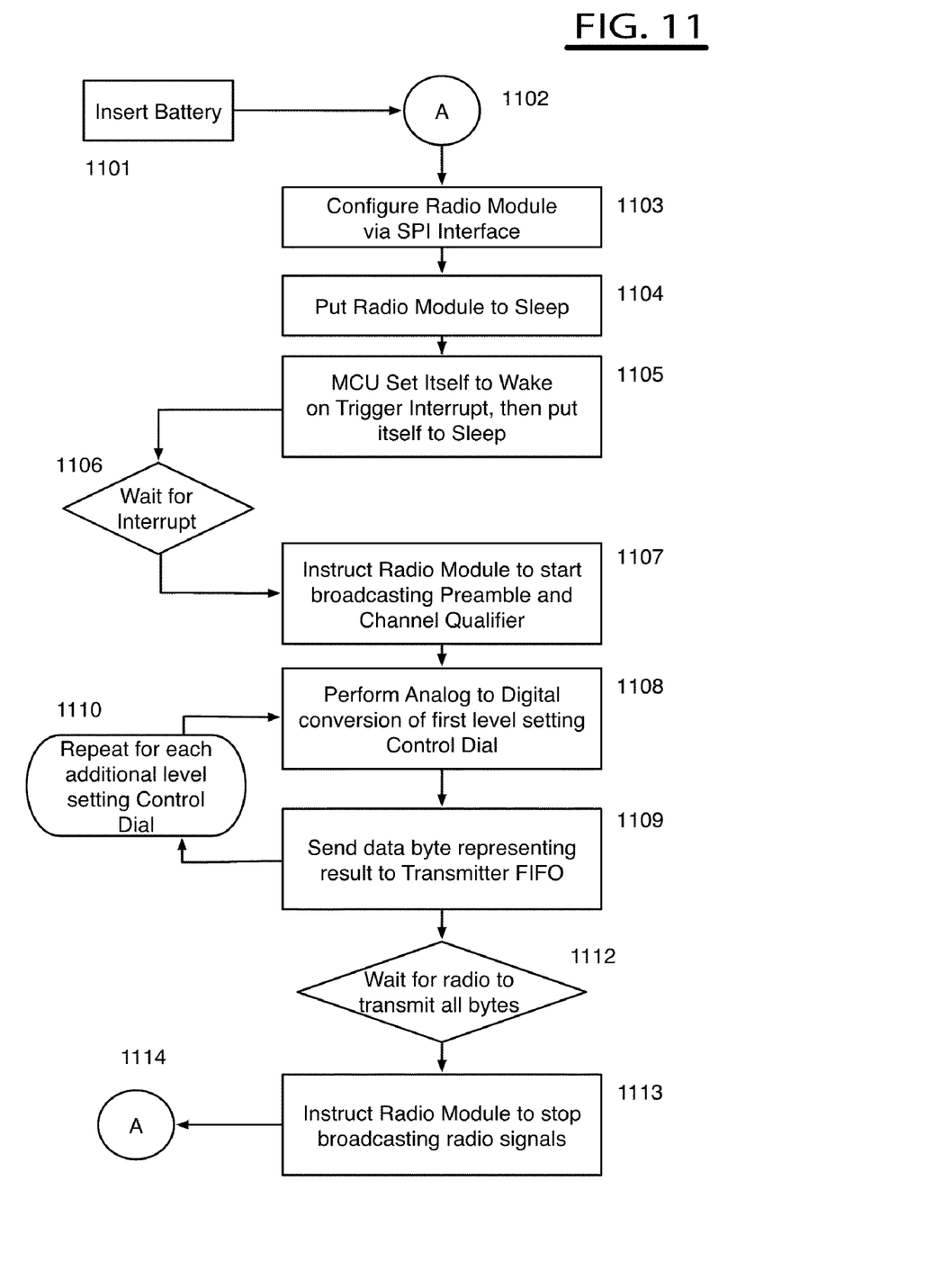
FIG. 11 representatively illustrates a simplified operational flow chart in accordance with an exemplary first radio communication device.
Figure 12:
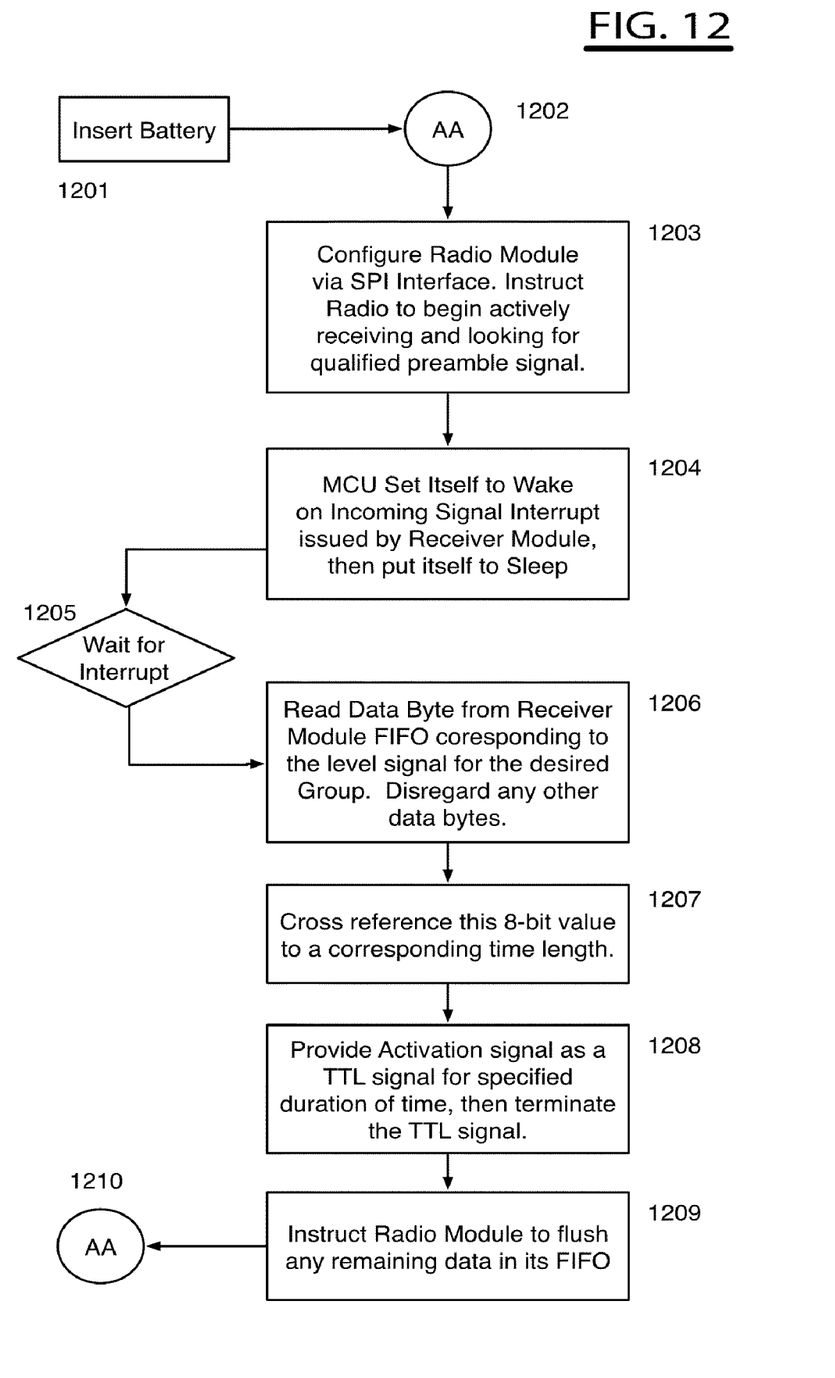
FIG. 12 representatively illustrates a simplified operational flow chart in accordance with an exemplary at least second radio communication device.

The following discussion may be more clearly understood by referencing the internal layout illustrations provided in FIG. 6 and FIG. 7, as well as the simplified schematic illustrations provided in FIG. 9 and FIG. 10, as well as the simplified operational flow charts provided in FIG. 11 and FIG. 12.

A transmitter unit 120 may comprise an exterior housing 628 which may be made of plastic, metal, or other appropriate material, and may comprise a printed circuit board 629 (hereafter "PCB") to which the various other components and circuitry of the transmitter unit may be physically and electrically connected as appropriate.

When a battery 630 is inserted in a transmitter unit 120 it may provide the circuit a voltage supply which may be approximately 3 volts (or other voltage as required or as appropriate) which may energize a main power supply header which may provide power to a microprocessor (hereafter "MCU") 631, a radio transmitter module 632, the bank of control dials 322, and a pull-up voltage to input signal connectors 323, 321, 327. A CR123 size battery may be used as it is readily available, is fairly low cost and may provide 3 volts required for operation without needing a voltage regulator, has high capacity (>1200 mAh) is small in size, and is commonly used for other photography field products including flash units and consumer digital cameras and thus should be available in most consumer stores and camera shops in most countries. It is considered that any power or voltage source may be used which may adequately power the circuitry of the device including but not limited to various rechargeable batteries.

The MCU 631, may be a PIC16F677 available commercially from Microchip Corp. An alternate microprocessor, the PIC16F882, also from Microchip is 28-pin and may be used if additional I/O pins are desired for the desired configuration. Each of these suggested MCU parts may include internal high speed clock oscillators and may require minimal external components such as bypass filtering capacitor 937 between the power supply and ground pins to operate; no external crystals or resonators may be required though in certain variations an external crystal or resonator may be desired or beneficial. The suggested MCU parts include a Serial Peripheral Interface ("SPI") 941 which may be a dedicated hardware interface capable of communicating data between various components at high speed and may be used to configure and operate the radio transmitter module 632.

The MCU 631 may be connected to a radio transmitter module 632, which may be a CC2500 available commercially from Texas Instruments. The model CC2500 may operate in the 2.4 Ghz radio band and may be compatible with other wireless radio protocols such as but not limited to Bluetooth, ZigBee and WiFi protocols. It may be possible for the described embodiment to communicate with or otherwise participate in various wireless networks of these or similar protocols. A CC1101, also available commercially from Texas Instruments may be used together with or in place of the stated CC2500. The CC1101 may operate in radio bands under 1 Ghz and may be compatible with operation in 900 Mhz ISM bands in North America as well as may be programmed for 869 Mhz band used for ISM in Europe, and the lower frequency of 900 Mhz compared to 2.4 Ghz has greater range and less signal loss through free space and objects compared to the higher frequency 2.4 GHz. A crystal 936 is provided as an accurate reference intermediate frequency used to synthesize the desired radio frequency. The radio module 632 may be connected to an antenna 325 directly or via various additional filtering, tuning, balun networks or other circuitry tuned to the desired radio frequency band.

A bank of control dials 322 may include standard analog trimming potentiometers (commonly called trimmer pots). A high resistance may be used on the pots to minimize current leakage as they may simply exist to provide an analog voltage reference to an MCU 631. Ranges of 1 Megohm to 50 Megohms should be fine with higher numbers resulting in less current leakage but may provide slightly less accurate readings and require longer times to complete analog to digital conversions when an MCU 631 is reading the pots. The outputs may be connected to pins of the MCU 631 that are capable of performing analog to digital conversions ("ADC").

It is considered by the present invention that various methods may be used to provide a user a means of setting a power emission level using any control that is rotary ("rotary control"), as a rotary adjustment may be the most direct and may be the most intuitive method for a user to indicate a power emission level to a device such as a transmitter unit. The rotary control may or may not include clicks or detents, the rotary control may have stops at either end to limit the rotation of a rotary control to one revolution or a portion of a single revolution, or the rotary control may spin freely in continual rotations. The rotary control may provide a knob, a thumb dial, or any other configuration which provides a manipulator or movable surface to a user which when manipulated by a user causes the rotation of a shaft or collar comprised within a rotary control or mechanically connected to a rotary control wherein the position or rotation of a shaft or collar may be used as an indication of a user's desired set point, such that the user's desired set point allows a desired light intensity level of a flash device or power emission level to be set or otherwise indicated by a user to a transmitter unit capable of transmitting any example of radio signals comprising a signal or data representing a setting of a rotary control which may be representative of a user's desired amount of illuminating light to be emitted from a flash device, such that a receiver unit or receiving device capable of receiving any example of a radio signal or radio signals may be capable of causing a flash device to emit an amount of illuminating light substantially corresponding to the user's desired amount of illuminating light that may have been set using a rotary control which may be comprised within or otherwise electrically connected to a transmitter unit which may be further coupled to a camera.

A bank of control switches 324 may be powered by the main voltage rail via pull-up resistors which have outputs to input pins on an MCU 631 and may be used to set various parameters desired by the user such as the desired radio frequency to transmit on. The control switches may be common dip switch type devices common on various PCB designs and computer circuit board designs.

The main voltage rail may power a pull-up resistor 935, the output of which may be electrically connected to an input pin of an MCU 631 and a jack 323 which may be used for connection to a synchronization connector 111 of a camera, and may also be connected to an electrical contact of a hot shoe connector 321 and optionally a test activation button or switch 327. The voltage allowed through pull-up resistor 935 may remain high at an MCU 631 until an activation signal is received from a camera 108 which may indicating the opening of a shutter of the camera 108, at which time the input to an MCU 631 may be pulled low and may cause a software interrupt within an MCU 631 which may cause the transmitter unit to begin an activation sequence. Using this configuration, either input 323, 321, or 327 can be pulled low to activate the transmitter unit while requiring only one pin on an MCU 631 as an input. A typical value for a pull-up resistor 935 is 10 k ohm, though other values may be used.

Contacts 633 may be provided via a modular connector or simply as exposed pads on the PCB which may be electrically connected to appropriate pins of an MCU 631 and may be used as an in-circuit-serial-programming ("ICSP") connector. A similar arrangement of contacts 633 may provide electrical connection to a J-Tag or similar port which may be provide for similar function on various MCU parts which may be commercially available from other manufacturers. Contacts 633 may be easily physically contacted for reprogramming and updating of the firmware or operating software executed by an MCU 631 by the manufacturer using an external chip programmer (not pictured) at any time after initial unit manufacturing.

Mode of Manufacture—Receiver

A receiver unit 250 may be similar to a transmitter unit 120 with a few changes as explained in the following discussion. When a battery 759 is inserted in a receiver unit 250 which may be a CR123 battery, a main power header may be powered which may provide power to an MCU 760, a radio receiver module 761, a transistor 1070 and capacitor 1071 circuit which may power a light signal source 62 which may be a visible spectrum or infrared spectrum light emitting diode ("LED").

An MCU 760, which may be a PIC16F882 available commercially from Microchip may be electrically connected 1076 to a radio receiver module 761 such as a Texas Instruments CC2500 or CC1101. The electrical connection between an MCU 760 and a radio receiver module 761 may comprise a SPI interface. The radio receiver module 761 may be connected to an antenna 454 directly or via various additional filtering, tuning, balun networks or other circuitry tuned to the desired radio frequency band, such that the radio receiver module 761 may be able to receive radio signals 116 on an appropriate frequency that may be transmitted by a transmitter unit 120.

A bank of control switches 452 may be powered by the main voltage rail, the control switches 452 may have outputs to input pins on an MCU 760 and may be used to set various parameters desired by a user which may include the desired radio frequency or channel to receive on, and may include a setting as to whether to send activation signals and/or quench signals via an electrical port 251, via an adaptor cable assembly using jack 255, via a light signal output means 762, and may include a setting as to which of a plurality of power emission levels to be responsive, and so on.

A port, connector, or jack 255 may be provided as a means to send activation signals and/or quench signals to a coupled flash device 212 either directly or via an adaptor cable assembly 280. A commonly available stereo phonographic jack such as a ⅛" stereo jack (hereafter "jack") which may include three conductor contacts may be used. Such a jack may provide an electrical connection to connect a common electrical ground of a circuit of a receiver unit 250 to the common electrical ground of a circuit of a flash device 212, and may provide an electrical connection to send activation signals, and may provide an electrical connection to send quench signals.

A first conductor pin of jack 255 corresponding to the tip of a male modular ⅛" stereo connector 585 may be electrically connected to the collector of an NPN transistor 1069, and a second conductor pin jack 255 corresponding to middle conductor of a modular ⅛" stereo connector 585 may be electrically connected to the collector of an NPN transistor 1075. The first conductor pin and second conductor pin of jack 255 may be used to effectuate the sending of activation signals and quench signals to a coupled flash device. A third conductor pin of jack 255 corresponding to the collar of a male modular ⅛" stereo connector 585 may be electrically connected to a common ground of a circuit of a receiver unit 250.

On each of the signal lines electrically connected to a jack 255, NPN transistors 1069 and 1075 may be tied to ground via the emitter of each NPN transistor 1069 and 1075. An MCU 760 may be electrically connected via a resistor on each signal line to the base of each NPN transistor 1069 and 1075. Diodes 1074 may be provided on each signal line to prevent potentially high voltage present as trigger voltage on a coupled flash device from reaching back to the MCU 760 and potentially damaging the receiver unit. An MCU 760 may force an output to the base of a given the transistor 1069 or 1075 high, and some current may flow from the base to the emitter of a transistor 1069 or 1075 causing it to allow current to flow from the collector to the emitter which may effectively cause a high voltage being supplied by a coupled flash device to a lower voltage or a voltage substantially near ground which may cause an coupled flash device to activate or quench as appropriate. This arrangement may be desirable as standard transistors may hold higher collector-emitter voltage (which may be in excess of 300 volts) than most flash devices are likely to present, and requires few inexpensive components. An example transistor may be a KSP44/45 available commercially from Fairchild Semiconductor.

A third NPN transistor 1070 may be used to turn on and off an electrical current through an LED 762 which may be supplied via a resistor 1072 and a capacitor 1071. A transistor 1070 may not be required to be rated for high voltages, and it may be advantageous for a transistor 1070 to have a fast switching time which may be shorter than 1 microsecond. A transistor 1070 may be a MMBT4401 available commercially from Fairchild Semiconductor. An MCU 760 may be electrically connected to the base of a transistor 1070 via a resistor. Causing an MCU 760 to place a high voltage on transistor 1070 may cause an LED 762 to begin emitting light and placing a low voltage on transistor 1070 may cause an LED 762 to stop emitting light.

The pins of a data port 251 may be each electrically connected to individual pins of an MCU 760, the pins of an MCU 760 may be configurable to perform any of multiple potentially useful functions. Examples of useful functions may include capability of being set as inputs or outputs via a software program of an MCU 760, capability of being configured individually or collectively as a data port such as a SPI port, a parallel port, a serial port, a differential signaling port, pins that may sense or convert analog voltages to digital data values, pins that may create or set a desired analog output voltage, or provide a clock signal or synchronous clock which may be used together with the transfer of data or other signals, and the like. The pins of a data port 251 do not necessarily need to be directly electrically connected to an MCU 760 as in some examples it may be desirable to pass the signal lines through various intermediate components which may include filtering components, electrical isolation components which may include opto-isolators, or other useful circuitry such as but not limited to digital potentiometers, digital to analog converters, and the like.

Thus it may be possible for a data port 251 to pass electrical signals, indicators, voltages, or data between a flash device 212 and a circuitry of a receiver unit 250, and/or between a circuitry of a receiver unit 250 and a flash device 212 such that any of many possible settings, status, or function may be set or activated of a flash device, which may include a desired amount of light a xenon tube should produce when activated which may correspond to a power emission level which may be set by a user on a transmitter unit 120.

Detailed Explanation of Exemplary Operational Sequence

A simplified operational flow chart in accordance with an exemplary embodiment of a transmitter unit 120 is illustrated in FIG. 11 and may be described as follows.

A transmitter unit 120 may power on upon the insertion of a battery power source at step 1101. An MCU 631 may configure a radio module 632 via SPI interface 941, 1103, and may cause a radio module 632 to enter a low power or sleep state 1104. An MCU 631 may then configure itself to wake on an interrupt which may be caused by a falling edge of a signal input means 323, 321, 327 and may then enter a low power or sleep state 1105.

When a user activates a camera shutter button 109, a camera 108 may pull low the voltage provided by a transmitter unit 120 via a contact present on a camera hot shoe 110 or synchronization connector 111. This may cause an interrupt 1106 which may wake an MCU 631 from a sleep state. An MCU 631 may immediately wake the a radio module 632 via SPI 941. (Alternately a transmitter module 632 may have been left in a more readied or more awake state but not broadcasting any radio signals 116 during step 1106, which may decrease the duration of time required for a transmitter module 632 to begin transmitting radio signals 116). An MCU 631 may then immediately instruct a transmitter module 632 to begin transmitting radio signals which may include a preamble, channel qualifier, and any other packet over-head which may indicate to a receiver unit 250 that a valid radio packet is present and should be demodulated or received at step 1107.

While a transmitter module 632 may be busy transmitting a preamble and/or a channel qualifier, an MCU 631 may perform an analog to digital conversion on one or more voltages which may be present on one or more potentiometers or dials 322 at step 1108. The an MCU 631 may derive one or more representative 8-bit data which may correspond to a voltage present on one or more potentiometer or dial 322, the one or more 8-bit data may be one or more power emission levels. The power emission levels which may each be represented as a single data byte which may be comprised of 8 data bits, may be sent to a data output first-in-first-out ("FIFO") buffer of a transmitter module 632 via a SPI 941 at step 1109. Once a transmitter module 632 completes sending a preamble and/or channel qualifier, the transmitter module 632 may automatically transmit one or more power emission levels from a FIFO buffer via radio signals 116 by transmitting the data byte values of the one or more power emission levels digitally by modulating a radio carrier signal using the an appropriate modulation standard or protocol at step 1112.

After the one or more power emission levels have been transmitted in step 1112, an MCU 631 may again instruct a transmitter module 632 to stop transmitting and resume a low power state at step 1113. An MCU 631 may then loop back to the start of the program at step 1114, 1102, and may again configure itself to wake on an interrupt which may be caused by the falling edge of a signal input means and may then go back to sleep at 1105.

A simplified operational flow chart in accordance with an exemplary embodiment of a receiver unit 250 is illustrated in FIG. 12 and may be described as follows.

A receiver unit 250 may be powered on upon the insertion of a battery power source 1201. An MCU 760 may configure a receiver module 761 via SPI 1076 at step 1203, and may then instruct a receiver module 761 to begin actively receiving radio signals and to being looking for any demodulated radio signal to match an expected preamble and/or channel qualifier which may represent a true and valid incoming signal ("valid signal") which may originate from a transmitter unit 120. An MCU 760 may then instruct a receiver module 761 to transition an output pin to cause an interrupt in the event that a valid signal is identified at step 1203. An MCU 760 may then configure itself to wake on an interrupt caused by the transition of the pin of a receiver unit 761 which may occur in response to the identification of a valid signal, and an MCU 760 may then enter a low power or sleep condition at step 1204.

An MCU 760 may then wait for an interrupt which may be in response to an incoming valid signal at step 1205. Upon an interrupt, an MCU 760 may wake from sleep or a low power condition at step 1206 and may begin reading received data values from a FIFO buffer of a receiver module 761 via SPI 1076. If a plurality of power emission levels or transmitter emission levels may be expected within a plurality of received data values, a receiver unit 250 may only process a given data value which may correspond to a power emission level the receiver unit 250 is intended to act upon, and may disregard other data values.

An MCU 760 may then correlate a power emission level or transmitted emission level data value to a period of time which may represent a delay interval at step 1207. A power emission level or transmitted emission level may be related to a given period of time which may represent a delay interval via a reference table that may be stored in a data memory of an MCU 760 or hard coded as a portion of operational firmware of an MCU 760.

An MCU 760 may then cause a high voltage on transistor 1069 which may cause activation signals to be sent to a coupled flash device 212. An MCU 760 may then allow a delay interval to elapse. An MCU 760 may then cause a high voltage on a transistor 1075 which may cause quench signals to be sent to a coupled flash device 212. This sequence illustrated at step 1208. The sequence of sending activation signals followed by allowing a delay interval to elapse followed by sending quench signals may be termed together a "TTL signal" or "TTL signals".

In accordance with an alternate exemplary embodiment of the present invention, during step 1208 (or similar step if the discussed sequence of events is altered in any way, or any other step which may or may not be illustrated in FIG. 11 or FIG. 12, or any other step or sequence that may be carried out by any exemplary embodiment or similar embodiment of the present invention), an MCU 760 may send any sequence of data or control signals to any example of a flash device electrically via a data port 251 or optically via constant, pulsed, digital, or other various coded light signals 878 which may be emitted by an LED 762 wherein the any sequence of data or control signals may or may not cause a flash device to emit light or initiate an event of being activated, and wherein the any sequence of data or control signals may or may not set an internal function of a flash device, and wherein the any sequence of data or control signals may or may not indicate to a flash device the amount of light that should be emitted by a xenon tube during an event of being activated. Moreover it is considered by the present invention that the any data or control signals may substantially correspond to a power emission level which may have been set by a user on a transmitter unit 120 via a rotary control or other means of user input.

An MCU 760 may then instruct a receiver module 761 to flush any contents of data remaining a FIFO register of the receiver module 761 at step 1209. An MCU 760 may then loop back to the start of the operational sequence 1210, 1202.

SUMMARY

In the foregoing specification, the invention has been described with reference to specific exemplary embodiments. Various modifications and changes may be made, however, without departing from the scope of the present invention as set forth in the claims. The specification and figures may be illustrative, rather than restrictive, and modifications may be intended to be included within the scope of the present invention. Accordingly, the scope of the invention should be determined by the claims and their legal equivalents rather than by merely the examples described.

For example, the steps recited in any method or process claims may be executed in any order and may be not limited to the specific order presented in the claims. Additionally, the components and/or elements recited in any apparatus claims may be assembled or otherwise operationally configured in a variety of permutations and may be accordingly not limited to the specific configuration recited in the claims.

Benefits, other advantages and solutions to problems have been described above with regard to particular embodiments; however, any benefit, advantage, solution to a problem or any element that may cause any particular benefit, advantage or solution to occur or to become more pronounced may be not to be construed as critical, required or essential features or components of any or all the claims.

As used herein, the terms "comprise", "comprises", "comprising", "have", "has", "having", "including", "includes", "employs", "employing" or any variation thereof, may be intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

What may be claimed may be:

1. A system to set an amount of light to be emitted by a remote flash device comprising:
    a first radio communication device coupled to a camera;
    a second radio communication device coupled to the remote flash device;
    a control being perceptible to the first radio communication device for setting an at least one power emission level;
    wherein the first radio communication device is configured to transmit at least one radio signal to the second radio communication device;
    wherein the at least one radio signal includes the at least one power emission level; and
    wherein the second radio communication device is configured to:
        receive the at least one radio signal,
        determine, from the at least one power emission level, the amount of light to be emitted by the remote flash device; and
        send signals to cause the remote flash device to emit the determined amount of light.

2. The system of claim 1, wherein the control is a rotary control, and wherein the at least one power emission level is indicated by an angular position of the rotary control.

3. The system of claim 1, wherein the second radio communication device is configured to relate the at least one power emission level to a delay interval.

4. The system of claim 1, wherein the signals sent by the second radio communication device include an activation signal to activate the remote flash device, followed by a duration of time corresponding to a delay interval elapsing, and a quench signal to quench the remote flash device.

5. The system of claim 4, wherein the second radio communication device is configured to send an activation signal to activate the remote flash device upon receiving the at least one radio signal.

6. The system of claim 1, wherein the at least one radio signal including the at least one power emission level causes the second radio communication device to store the at least one power emission level as a stored delay interval.

7. The system of claim 1, wherein the second radio communication device is able to relate the at least one power emission level to any sequence of data or control signals.

8. The system of claim 7, wherein the second radio communication device sends the any sequence of data or control signals to the remote flash device in response to receiving the at least one radio signal.

9. The system of claim 8, wherein the remote flash device sets the light emission intensity in response to the any sequence of data or control signals.

10. The system of claim 8, wherein a xenon tube of the remote flash device is activated in response to the any sequence of data or control signals.

11. A system to set an amount of light to be emitted by a remote flash device comprising:
    a first radio communication device;
    a second radio communication device coupled to the remote flash device;
    a control being perceptible to the first radio communication device to set at least one power emission level of the first radio communication device;
    wherein the first radio communication device is configured to transmit at least one radio signal to the second radio communication device; and
    wherein the at least one radio signal includes the at least one power emission level, the at least one power emission level indicating the amount of light to be emitted by the remote flash device.

12. The system of claim 11, wherein the second radio communication device receives the at least one radio signal including the at least one power emission level, wherein the second radio communication device relates the at least one power emission level to a duration of time during which the remote flash device is to emit light.

13. The system of claim 12, wherein the second radio communication device, in response to receiving the at least one signal, is configured to:
    send activation signals to the remote flash device coupled therewith;
    allow the duration of time to elapse;
    and then send quench signals to the remote flash device.

14. The system of claim 12, wherein the second radio communication device, in response to receiving the at least one radio signal, is configured to store the duration of time; and wherein the second radio communication device, in response to receiving at least a second radio signal, is further configured to:
    send activation signals to the coupled flash device;

allow the stored duration of time to elapse;
then send quench signals to the coupled flash device.

15. A method of wirelessly communicating an amount of light that should be emitted by a flash device, the method comprising:
providing a control wherein an adjustment thereof is perceptible to a first radio communication device;
configuring the first radio communication device to transmit at least one radio signal to include a value of the adjustment substantially representative of an amount of adjustment or position of the control;
providing a second radio communication device;
configuring the second radio communication device to receive the at least one radio signal from the first radio communication device; and
determining, by the second radio communication device, an amount of light to be emitted by the flash device, by relating the value of the adjustment of the control to a period of time during which the flash device is to emit light.

16. The method of claim 15, further comprising:
further configuring the second radio communication device to:
send activation signals to the flash device;
allow the period of time to elapse; and
send quench signals to the flash device.

17. The method of claim 15, further comprising:
configuring the first radio communication device to be perceptible of a signal from a camera.

18. The method of claim 15, further comprising:
configuring the second radio communication device, immediately upon receiving the at least one radio signal, to:
begin a process of sending activation signals to a coupled flash device;
allow the period of time to elapse; and
send quench signals to the flash device.

19. The method of claim 15, further comprising:
configuring the first radio communication device to transmit a second radio signal in response to receiving a signal from a camera; and
configuring the second radio communication device to:
store the period of time;
wait for the second radio signal to indicate to the second radio communication device to proceed with a process of sending activation signals to the flash device;
allow for the period of time to elapse; and
send quench signals to the flash device.

20. The method of claim 15, further comprising:
configuring the first radio communication device to be perceptive of a signal from a camera;
configuring the first radio communication device to transmit the at least one radio signal in response to the signal being sent from the camera; and
configuring the second radio communication device to send activation signals to the flash device in response to receiving the at least one radio signal.

21. A system comprising:
a first radio communication device coupled with a camera;
a second radio communication device coupled with a flash device and configured to cause a desired amount of light to be emitted by the flash device by determining the amount of time necessary for the flash unit to be activated in order to emit the desired amount of light, sending an activation signal to activate the flash device, then sending a quench signal to quench the flash device after allowing the determined amount of time to elapse, the second radio communication device further configured to receive a radio communication from the first radio communication device;
a manually adjustable control on the first radio communication device configured to cause an adjustment to the radio communication sent from the first radio communication device to the second radio communication device, and to effect a corresponding adjustment of the signals sent to the flash device by the second radio communication device to effect a corresponding adjustment of the desired amount of light emitted by the flash device.

22. The system of claim 21, wherein the first radio communication device is configured to convert a position of the control into a value to be included in the radio communication received by the second radio communication device, and wherein the second radio communication device is configured to convert the value to the duration of time during which the flash device emits light.

23. The system of claim 21, further comprising:
one or more additional flash devices;
one or more additional radio communication devices each respectively coupled with the one or more additional flash devices and each configured to send signals to each respective one or more additional flash devices to control an amount of light emitted by each respective one or more additional flash devices;
each of the one or more additional radio communication devices configured to receive a radio communication from the first radio communication device; and
one or more additional manually adjustable controls on the first radio communication device configured to adjust the radio communication sent from the first radio communication device and received by each respective additional radio communication device to effect a corresponding adjustment of the respective signals sent to the respective one or more additional flash devices by the respective one or more additional radio communication devices to effect a corresponding adjustment of the amount of light emitted by each of the respective one or more additional flash devices.

24. The system of claim 21, wherein the power emission level is determined by a delay interval.

* * * * *